A. EKLUND.
BRACELET LINK.
APPLICATION FILED MAR. 31, 1915.

1,162,227. Patented Nov. 30, 1915.

Witnesses
W. W. Bardsley.
A. F. Macready

Inventor
Alexander Eklund.

By Howard E. Barlow
Attorney

COLUMBIA PLANOGRAPH CO., WASHINGTON, D. C.

UNITED STATES PATENT OFFICE.

ALEXANDER EKLUND, OF ATTLEBORO, MASSACHUSETTS, ASSIGNOR TO STURDY-CUMMINGS COMPANY, OF ATTLEBORO FALLS, MASSACHUSETTS, A CORPORATION OF MASSACHUSETTS.

BRACELET-LINK.

1,162,227.

Specification of Letters Patent. Patented Nov. 30, 1915.

Application filed March 31, 1915. Serial No. 18,238.

*To all whom it may concern:*

Be it known that I, ALEXANDER EKLUND, a citizen of the United States, and resident of Attleboro, in the county of Bristol and State of Massachusetts, have invented certain new and useful Improvements in Bracelet-Links, of which the following is a specification.

This invention relates to extendible bracelet links and has for its object to provide in such a link an interconnecting guide link and slide link, the latter link being constructed in a hook form, whereby the different links of the bracelet may be readily connected together.

A further object of the invention is to provide one end of the slide link with a hook of the closed mouthed type, and to form the over-lapping ends of this hook so that when closed these ends will interlock one with the other.

The invention further consists in the provision of an integral lug on the slide link at the bend of the loop opposite the hook end, which lug is adapted to engage one of the opposite guide members to guide one end of the slide link, the opposite end of the slide link being supported on one of the bridges connecting said guide members.

With these and other objects in view, the invention consists of certain novel features of construction, as will be more fully described, and particularly pointed out in the appended claims.

Figure 1:
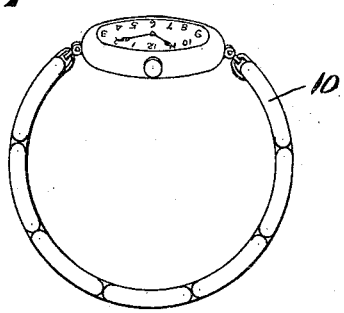
Figure 2:
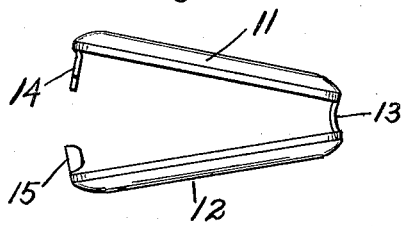
Figure 3:
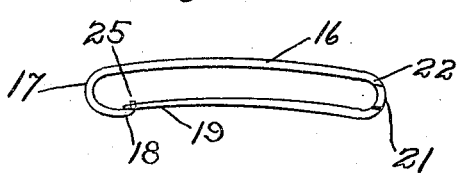
Figure 5:
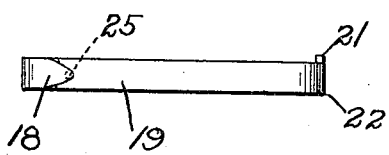
Figure 4:
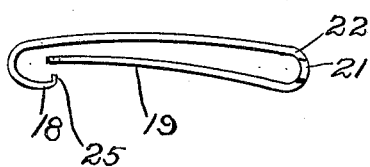
Figure 6:
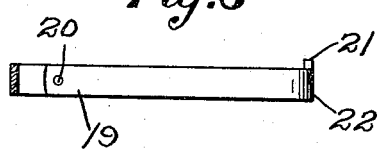
Figure 7:
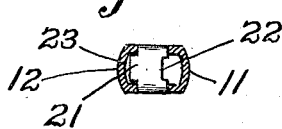
Figure 8:
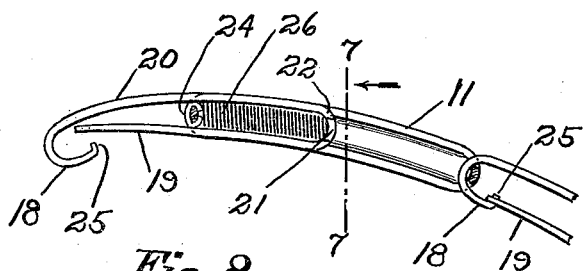

In the accompanying drawings: Figure 1— is a view of a complete bracelet attached to a watch. Fig. 2— is a side elevation showing one of the guide links formed with its two trough shaped members open at one end. Fig. 3— is a side elevation of the slide link showing the same as constructed in hook form with the over-lapping ends of the hook interlocked one with the other. Fig. 4— is a view similar to Fig. 3 showing the overlapping ends of the hook in open position. Fig. 5— is an underneath view of this hook link showing the laterally extending guide lug at the bend opposite the hook end. Fig. 6— is also an underneath view of the slide link representing a portion of the hook as removed to show the recess in one end for receiving the projection on the opposite end. Fig. 7— is a section on line 7—7 of Fig. 8 looking in the direction of the arrow showing the guide lug on the slide link projecting into the trough of one of the guide link members. Fig. 8— shows a guide link with one of its members removed and a slide link in extended position therein with its hook end open, also showing another hook link connected to the bridge at the opposite end of the guide link.

Referring to the drawings 10 designates the guide link member of my improved link, which is herein shown as being formed of two trough shaped members 11 and 12 connected together by a bridge 13 at one end, and by interlocking members 14 and 15 at the opposite end, but I do not wish to be restricted to the use of this particular form of guide link as other forms may be used if desired.

The essential feature of my present invention is the construction of a slide link member 16 which is preferably formed of a narrow bar of a width to slide in the space between the trough shaped members which bar is bent into an elongated loop form, one end 17 of the loop being folded over into the form of a hook, the ends 18 and 19 of which being formed to over-lap each other. I have shown the end 18 as provided with a short inwardly extending member 25 adapted to be passed through a corresponding opening 20 in the opposite end 19 by which construction the end of the hook is turned inwardly and so prevented from any possibility of catching upon fine fabric or abrading the arm of the wearer of the bracelet, but the projection and opening may be reversed and formed in the opposite members if desired. By this construction of slide link the inherent spring in the stock of the under member 19 causes the same to normally lie against the member 18 to close the hook, requiring pressure of the thumb and finger, on the back 20 and underneath tongue 19 in order to open the hook. Then again another advantage in connecting the two adjacent ends of the hook together, is that the strength of the hook is greatly increased as it is thus prevented from being opened up by any unusual strain which may be brought to bear upon the bracelet to pull the links apart, which might be the case if the ends of the hook were not connected together.

Another feature of my improved slide link is that I have formed a laterally extending boss or lug 21 on the side of this loop at the bend 22 opposite the hook end, and I preferably form this boss integral with the slide member by striking the same at the bend 22 and off-setting the stock on the opposite side, forming a projection thereon, whereby this integral lug or projection 21 thus formed is adapted to enter the trough 23 of the guide member 12 to provide a simple and effective guide for the inner end of the slide link. This means of providing a guide for the slide link is extremely simple, inexpensive, and most effective, and by its use I am enabled to do away with soldering or other means of connecting a guide bar to the link which is not only expensive, but the heat necessary for the soldering operation injures the gold plate on the stock. The opposite end of the slide link bears upon the bridge member 24 forming a second bearing point for guiding this slide link. A compression spring 26 is placed in the guide link to act upon the slide link to press the same inward and hold the parts normally in contracted position.

I claim:

1. In a bracelet, an interconnecting guide link and slide link, said guide link comprising two side halves connected together in spaced apart relation, said slide link being in elongated loop form and adapted to slide in the space between said halves, said loop having one end bent into a hook form and having over-lapping end portions, one of the ends of said over-lapping portions being provided with a projection adapted to pass through a corresponding perforation in the other over-lapping portion.

2. In a bracelet, an interconnecting guide link and slide link, said guide link comprising two side halves connected together in spaced apart relation and said slide link being adapted to slide in the space between said halves and having one end split to form a spring hook, the joining end portions of the hook over-lapping each other, the end of the outer over-lapping portion being provided with an inwardly turned extension adapted to pass through a corresponding perforation in the inner portion.

3. In a bracelet, an interconnecting guide link and slide link, said guide link comprising two trough shaped side halves connected together at their ends in spaced apart relation, said slide link being formed in the shape of an elongated loop, an integral laterally extending guide lug formed at the bend at one end of said slide link, said lug being adapted to enter and slide in one of said trough members to serve as a guide on one end of said slide link, the stock at the opposite end of said slide member being bent into hook form with over-lapping ends said ends being adapted to be sprung apart to open the band to engage the next adjacent link.

In testimony whereof I affix my signature in presence of two witnesses.

ALEXANDER EKLUND.

Witnesses:
FRANK G. GRANT,
JOHN W. ABRAMS.

Copies of this patent may be obtained for five cents each, by addressing the "Commissioner of Patents, Washington, D. C."